US008477370B2

(12) United States Patent
Dalal et al.

(10) Patent No.: US 8,477,370 B2
(45) Date of Patent: Jul. 2, 2013

(54) COLOR MAPPING DETERMINATION FOR AN N-COLOR MARKING DEVICE BASED UPON COLOR STABILITY

(75) Inventors: Edul N. Dalal, Webster, NY (US); Wencheng Wu, Webster, NY (US); Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 775 days.

(21) Appl. No.: 12/727,760

(22) Filed: Mar. 19, 2010

(65) Prior Publication Data

US 2011/0228290 A1    Sep. 22, 2011

(51) Int. Cl.
*H04N 1/60* (2006.01)
*H04N 1/46* (2006.01)

(52) U.S. Cl.
USPC ............. 358/1.9; 358/518; 358/523; 358/504

(58) Field of Classification Search
None
See application file for complete search history.

(56) References Cited

U.S. PATENT DOCUMENTS

| | | | |
|---|---|---|---|
| 7,239,422 B2 | 7/2007 | Braun et al. |
| 7,245,395 B2 | 7/2007 | Couwenhoven et al. |
| 7,365,879 B2 | 4/2008 | Braun et al. |
| 7,376,269 B2 | 5/2008 | Klassen et al. |
| 7,382,507 B2 | 6/2008 | Wu |
| 7,486,416 B2 | 2/2009 | Dalal et al. |
| 7,495,804 B2 | 2/2009 | Rozzi |
| 2005/0160092 A1 | 7/2005 | Mestha et al. |
| 2006/0103899 A1 | 5/2006 | Wu |
| 2006/0110009 A1 | 5/2006 | Klassen et al. |
| 2006/0215240 A1 | 9/2006 | Mongeon |
| 2006/0244980 A1 | 11/2006 | Grace |
| 2008/0137914 A1 | 6/2008 | Minhas |

OTHER PUBLICATIONS

Briggs, et al., Applications of ISO-13660, A New International Standard for Objective Print Quality Evaluation, Imaging Society of Japan, Jul. 21-23, 1999 Tokyo, Japan.
Hann, Daniel S., "Specular Image Capture and Evaluation for Microgloss Uniformity Measurements,"May 22, 2003.

(Continued)

*Primary Examiner* — Twyler Haskins
*Assistant Examiner* — Christopher D Wait
(74) *Attorney, Agent, or Firm* — Philip E. Blair; Fleit Gibbons Gutman Bongini & Bianco P.L.

(57) ABSTRACT

What is disclosed is a novel system and method for determining color profiles based upon optimizing image output color stability. For each of a number of selected output colors, color stability values for a set of device-dependent color specifications that produce the selected output color are iteratively determined. The set of device-dependent color specifications is generated by varying a subset of colorants in the device-dependent color specifications while changing the remaining colorants to maintain the selected output color. The iterative process improves the color stability value, as determined by a color stability model, of the device-dependent color specifications that correspond to the selected output color. When an optimum color stability value is found, the device-dependent color specification having that color stability value is selected as the mapping for the selected device-independent color specification. Various embodiments are disclosed.

20 Claims, 6 Drawing Sheets

OTHER PUBLICATIONS

"Image Technology Colour Management—Architecture, Profile Format, and Data Structure," Specification ICC.1:2004-10 (Profile Version 4.2.0.0); Revision of ICC.1:2003-09, With Errata Incorporated May 22, 2006m International Color Consortium, ICC 2004.

Rasmussen, et al., "ISO 19751 Macro-Uniformity".

U.S. Appl. No. 12/352,841, "Job-Specific Print Defect Management," filed Jan. 13, 2009.

U.S. Appl. No. 12/727,692, "Image Quality Performance for a Color Marking Device," filed Mar. 19, 2010.

U.S. Appl. No. 12/727,724, On-Paper Image Quality Metric Using On-Belt Sensing, filed Mar. 19, 2010.

U.S. Appl. No. 12/727,791, "Color Mapping Determination for an N-Color Marking Device Based Upon Image Spatial Noise Defects," filed Mar. 19, 2010.

COLOR MAPPING DETERMINATION FOR AN N-COLOR MARKING DEVICE BASED UPON COLOR STABILITY

TECHNICAL FIELD

The present invention is directed to systems and methods to determine device-independent color specification to device-dependent color specification mapping based upon a method to improve color stability in N-color marking devices where $N \geq 4$.

BACKGROUND

In digital imaging systems, color management is the controlled conversion between the color representations of various devices, such as image scanners, digital cameras, monitors, TV screens, film printers, office printers, offset presses, corresponding media, and the like. One primary goal of color management is to obtain a good match across different color devices. For example, a video should appear the same color when displayed on a computer LCD monitor, a plasma TV screen, and on a printed frame of that video. Color management helps achieve a same color appearance across a variety of devices, provided the devices are capable of delivering the needed color intensities. One cross-platform view of color management is the use of an ICC-compatible color management system. The International Color Consortium (ICC) is an industry consortium which defined open standards for a Color Matching Module (CMM) at the OS level, and color profiles for the devices and working space (color space the user edits in).

A color printer destination profile provides a set of device-dependent colorant values (e.g., CMYK) necessary to produce a given color corresponding to a given device-independent color specification (e.g., L*a*b*). For a 4-color (CMYK) printer, this is a three variable to four variable transformation, i.e., transforming L*a*b*→CMYK, which is underdetermined. As a result, there are many device-dependent color specifications for each device-independent color specification. In other words, there is more than one CMYK combination that can produce a given L*a*b*. More combinations are possible when more than 4 colorants are used, e.g., six color CMYKOV. Consequently, in creating a destination profile for a given device, it is often necessary to select one device-dependent color solution out of the several possible solutions for each device-independent color specification. In 4-color printers (CMYK), this selection is often performed by choosing a GCR (Gray Component Replacement) strategy. GCR is a color strategy which relates an amount of CMY to an amount of Black (K). This can lead to a 3-to-3 transformation which has a unique solution. There are, of course, a multiplicity of GCR strategies that can be chosen. Each strategy is equally valid from a colorimetric viewpoint. Applying a fixed GCR strategy does not always provide an optimal solution across the available output gamut of a particular device.

Accordingly, what is needed in this art are increasingly sophisticated systems and methods for selecting an optimum colorant set from the set of available color combinations for a given N-color color device thereby defining a device-dependent color specification that produces a desired device-independent color value while optimizing color stability and thus improving device performance.

INCORPORATED REFERENCES

*International Color Consortium—Profile Specification—Version 4.2.0.0 describing image technology, architecture, profile format and structure.* (2004).

BRIEF SUMMARY

What is disclosed is a novel system and method for selecting a colorant set from all available color combinations for a given 4-color device to so as to produce a device-dependent color specification for a given device-independent color specification that improves overall device performance. For each of a number of selected output colors, color stability values for a set of device-dependent color specifications that produce the selected output color are iteratively determined. The set of device-dependent color specifications is generated by varying a subset of colorants in the device-dependent color specifications while changing the remaining colorants to maintain the selected output color. A directed search is performed in the iterative process to improve the color stability value, as determined by a color stability model, of the device-dependent color specifications that correspond to the selected output color. When an optimum or acceptable (i.e., below a pre-determined threshold) color stability value is found, the device-dependent color specification having that color stability value is selected as the mapping for the selected device-independent color specification. Advantageously, the present method utilizes a color stability function which receives weighted contributions from several selected color stability attributes including: within page color stability, within run color stability, and long run color stability (such as run-to-run and day-to-day color stability). The present method is readily extendible to N-color devices, where $N \geq 4$.

In one example embodiment, the present method for producing device-dependent color specifications for an N-color device, where $N \geq 4$, involves the following. First, a selected device-independent color specification is received. A current device-dependent color specification for a target N-color device, which corresponds to the selected device-independent color specification, is determined. The following is then iteratively repeated until a termination condition based upon the convergence of a transform of the selected device-independent color specification to a device-dependent color specification is determined. A set of changed colorant values is created by changing, by a selected amount, values of a selected subset of colorants within the current device-dependent color specification. A modified device-dependent color specification, which comprises the changed colorant values for the selected subset of colorants and values determined, based upon a printer model of the target N-color device, for remaining colorants of the modified device-dependent color specification is determined so that the modified device-dependent color specification containing the changed colorant values yields the selected device-independent color specification. In the modified device-dependent color specification, the remaining colorants are different than the selected subset of colorants. A new color stability value associated with the modified device-dependent color specification is determined. The new color stability value is compared with previously determined color stability values. The amount to change values of the selected subset of colorant values within the device-dependent color specification during a next iteration is adjusted based upon the comparing of the new color stability value with previously determined color stability values. A convergence of the transform of the selected device-independent color specification to a device-dependent color specification is determined in a manner more fully described herein to produce a resulting device-dependent color specification. Once convergence has been determined, the resulting device-dependent color specification is stored in a color characterization of the target N-color device as a mapping for the selected device-independent color specification. The color characterization is output. Various embodiments have been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for selecting a colorant set from available color combinations for a given 4-color device so as to produce a device-dependent color specification for a given device-independent color specification that improves overall device performance. The present method advantageously utilizes a color stability function which is able to receive weighted contributions from several selected color stability attributes including: within page color stability, within run color stability and long run color stability.

It should be understood that one of ordinary skill in this art would be readily familiar with many facets of color science such as, but not limited to, color space, color gamuts, gamut mapping, and other related techniques and algorithms common in the digital document reproduction arts. Additionally, one of ordinary skill would also be familiar with techniques used for color manipulation and various color transformation processes and the systems involved with color imaging. Those of ordinary skill would be familiar with the text: "*Digital Color Imaging Handbook*", CRC Press (2003), ISBN-13: 978-0849-309007, and "*Control of Color Imaging Systems: Analysis and Design*", CRC Press (2009), ISBN-13: 978-0849-337468, both of which are incorporated herein in their entirety by reference. One of ordinary skill would also be knowledgeable about computer science and software and programming techniques and systems and methods sufficient to implement the functionality and capabilities described herein in their own system environments without undue experimentation.

NON-LIMITING DEFINITIONS

A "Device-Independent Color Space" is any standard color space that is commonly used to define or describe color, e.g. CIE XYZ, CIE L*a*b*, CIE L*u*v*, sRGB etc.

A "Device-Dependent Color Space" is a color space that is non-standard and cannot be used to commonly define colors without additional information such as the characteristics of the rendering device. For example, the commonly used CMYK color space for 4-color printers is a device-dependent color space since the rendering of a given combination of CMYK colors could yield very different (device-independent) colors from one model of a printer to another model of a printer. As another example, the non-standard RGB space is also a device-dependent color space since the rendering of an RGB image could appear differently from one model of a CRT monitor to another model of a CRT monitor.

A "color separation" refers to an individual separation corresponding to one of the colorants of a target marking system. For example, there are 4 separations: C, M, Y, K for a 4-color CMYK printer. Combinations of all color separations can be used to produce a range of colors by the target marking system.

A "single-separation color" refers to a color specified with only one of the color separations for a target marking system. For example, for a CMYK printer, a C-only test patch is a single-separation color test patch.

A "multi-separation color" refers to a color specified with more than one of the color separations for a target marking system. For example, for a CMYK printer, a red test color is a multi-separation color test patch, which uses combinations of M and Y separations at some pre-determined levels, respectively.

A "colorant" refers to the medium used for rendering a particular color separation which, in forming a multi-colored image, is combined with one or more other colorants to achieve image colors throughout the spectrum. Each color separation thus may have its own corresponding colorant.

A "printer model" converts values in a device-dependent color space to values in a device-independent color space for a target marking system. A printer model can have the form of a look-up table (LUT) such as a 4-D LUT for CMYK printer, or a parameterized fitted function such as a polynomial that relates inputs in device-dependent color space to outputs in device-independent color space. For CMYK color space as the target device-dependent color space and L*a*b* color space as the output device-independent color space, updating the printer model includes, for example, for each of a selected number of the data nodes within the printer model: (a) printing a patch using the specified CMYK components; (b) measuring the color L*a*b* of this printed patch; (c) compiling the relationship between this input CMYK specified and its corresponding measured output L*a*b* for each node; and finally (4) storing these compiled relationships of all the nodes into a form of LUT. This LUT can now be used to map any CMYK in device-dependent color space to its predicated output L*a*b* in the device-independent color space for a target marking system, and is thus the printer model for this target marking system.

A "device-dependent color specification" for a color refers to a particular combination of values within a device-dependent color space that is used to produce a particular value within a device-independent color space by a target marking system.

A "profile", for a given device, is a multi-dimensional color correction lookup table (LUT) generally comprising a series of nodes in an input color space (L*a*b or XYZ), and device-specific (CMYK) output values stored at each node. When the input pixels to be corrected correspond to the nodes of the LUT, the corresponding device-specific color values are retrieved directly from the LUT. If the pixels are not on the node then they are derived via interpolation using a variety of standardized techniques, such as, for example, tetrahedral interpolation. In general, a profile is derived from a forward model that maps a device-specific (CMYK) representation to a visual (L*a*b) color representation. These mathematical transformations are often embodied as multi-dimensional LUTs which provide the capability to match the printed color to a proofing device. A multi-dimensional profile LUT has finite nodes for which device CMYK values are calculated during profile creation. In general, a color characterization model is a description of a specific device in terms of the transformations required to convert device-independent color information to device-dependent color space.

A "storage device" refers to a device or system capable of storing values for subsequent retrieval. One embodiment of a storage device is a hard disk, as are well known in the arts, placed in communication with a computer system or workstation. The term "storage devices" is intended to include volatile and non-volatile storage such as, for example, RAM, ROM, Cache Memory, CD-ROM, DVD, flash drives, and the like.

The term "color stability" refers to a characteristic of a multi-color printer that characterizes output color variations for a given device-dependent color specification over one or more of: time, across different output devices, and/or across different portions of an output image. Different types of color stability are able to be characterized and modeled across an output color gamut of device-dependent color specifications. Each device-dependent color specification has a color stability value for each type of color stability of interest. Different color stability values are able to be determined for a particular device-dependent color specification to reflect, for example, within image color stability and within job color stability. Similarly, color stability values for a particular device-dependent color specification can be determined for different images that were created at respective times that contain that particular device-dependent color specification and that are separated by various amounts of time and/or various amounts of intervening images having been produced. Color stability is also able to be characterized for an individual printer or for a family or other population of printers. Various color stability models for the device-dependent color specifications within an output device's gamut are able to be characterized to better represent the output performance of that device over, for example, short/single page jobs, different printers, or long print runs.

A "color stability value" refers to a quantity associated with a particular set of values of a device-dependent color specification. A color stability value represents an amount by which a color produced by a printer or a group of printers will vary across either a printed page or across a period of time or number of pages.

Figure 1:
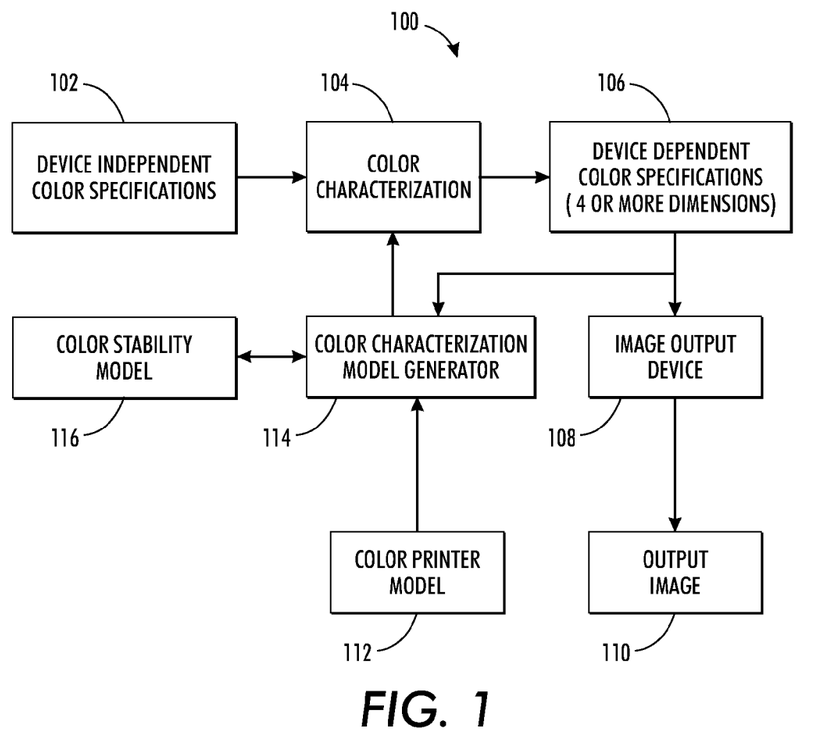
FIG. 1 illustrates a device-independent color specification to device-dependent color specification transformation.

Reference is now being made to FIG. 1 which illustrates a device-independent color specification to device-dependent color specification transformation shown comprising a plurality of modules.

In one example, a device-independent color specification 102 is provided for a desired color to be printed. A common example of a device-independent color specification 102 is a L*a*b* color specification that specifies three values for L*, a*, and b*, respectively. Particular values assigned to three color dimensions are able to specify a particular color in a standard device-independent format that is able to be exchanged among various devices and used to present a particular color by each device receiving this device-independent color specification. A color characterization model 104 is used to transform a received device-independent color specification into a device-dependent color specification 106. Various image output devices use, for example, more than three color components to create a particular output color. A common example is a four color output device, such as a printer, that uses specified amounts of Cyan, Magenta, Yellow, and Black colorant to create a specific output color. Another example is a six color printer that uses specified amounts of Cyan, Magenta, Yellow, Orange, Violet, and Black to create a specific output color. The device-independent color specification is defined by three variable values and these three values are required to be transformed into the four or more colorant values that are to be used by the color output device to generate the color specified by the device-independent color specification. The color characterization model 104, which is generated in one embodiment of the present method, provides the transform function to transform any received device-independent color specification into a device-dependent color specification, which is able to contain four or more dimensions. The device-dependent color specification 106 is then provided to an image output device 108. Image output device 108 is able to be any device capable of producing a color image in, for example, a hardcopy format or an electronic display format. For example, image output device 108 is able to be a four color printer, a six color printer, a printer utilizing any number of colorants to create color hardcopy outputs. The image output device 108 is also able to include an electronic display able to produce color images to be presented to a viewer.

The image output device of one embodiment produces an output image 110. The form of the output image corresponds to the function of the image output device 108. For example, an image output device that is a color hardcopy printer will produce a color hardcopy output. An image output device that is a color electronic display will produce a color image on that electronic display. In one embodiment, a color characterization model generator 114 generates color characterization model 104 by optimizing the color stability of the transformation between the device-independent color specification 102 and the device-dependent color specification 106 using a color printer model 112 and a color stability model 116.

Color stability in one embodiment hereof includes characterizing output color variability over time and/or across different portions of the output image 110. As described in further detail below, the color characterization model generator 114 produces color characterization models 104 that are improved based upon increasing the color stability, i.e., reducing the output color variability over time, of the device-dependent color specifications that are specified by the color characterization model 104 for particular device-independent color specifications 102. As described below, the color stability model 116 is able to produce different values reflecting different types of color stability for each device-dependent color specification. For example, different color stability values are able to be determined for a particular device-dependent color specification to reflect within image color stability and within job color stability. Similarly, color stability values for a particular device-dependent color specification can be determined for different images that were separated by various amounts of time and/or various amounts of intervening images having been produced. A particular color characterization model to be produced by the color characterization model generator 114 is able to be made to better accommodate a particular type of print job, such as a short/single page job or a long print run, by developing a color characterization model that optimizes a particular weighted function that reflects the color stability characteristics most applicable to that job.

In one embodiment, a candidate print job is able to be analyzed to determine by automatic calculation the proper weighting factors to assign the various color stability characteristics in order to best produce that candidate print job. One example uses a combination of weighted values of the different color stability values, e.g., within image and within job values, to obtain a desired function to optimize in generating a particular color characterization model. One example of a weighted function to be optimized for each device-dependent color specification is defined as:

$$F(cmyk) = \sqrt{\sum_i w_i \cdot A_i^2(cmyk)} \quad (1)$$

where F(cmyk) is a weighted combination of color stability values, to be used for the specified device-dependent color specification cmyk, $w_i$ is a weighting factor to be used for the particular color stability value, and $A_i(cmyk)$ is the particular color stability value for a particular characteristic of the image output device. For example, $A_1(cmyk)$ is a "within page" color stability value for the device-dependent color specification values "cmyk"; $A_2(cmyk)$ is a "within job" color stability value for the device-dependent color specification values "cmyk" for sequential pages; and $A_3(cmyk)$ represents a "run-to-run" color stability value for the device-dependent color specification values "cmyk" for images that are printed over many print runs or jobs, which are separated by printer start-ups and cycle-downs.

In an additional application of the present method, when creating a color characterization model for a number of devices, such as a family of printer models, another color stability metric $A_4(cmyk)$ is used which is a machine-to-machine color stability value for the device-dependent color specification values "cmyk" for images that are produced by different machines. The machine-to-machine color stability is given its own weighting factor, $w_4$, according to the importance of that characteristic to the intended use of the color characterization model to be generated. Various applications are able to combine particular color stability values to support producing a color characterization model according to the type of job anticipated to be produced. For example, when determining color stability for a color characterization model to be used on a single page, a higher value is used for $w_1$ than $w_2$ or $w_3$ in the above example. Conversely, when developing a color characterization model to be used for long runs of color image production, a higher value is given to $w_3$ and $w_2$ than is given to $w_1$ to reflect the important color stability value for that type of job. The color characterization model defines color characterizations that are used in, for example, printing the resulting device-dependent color specification, storing the resulting device-dependent color specification to a storage device, updating a lookup table, deriving a color profile for the device, producing a profile for spot color emulation, and generating a device-dependent recipe for a spot color.

Example Flow Diagram of One Embodiment

Figure 2:
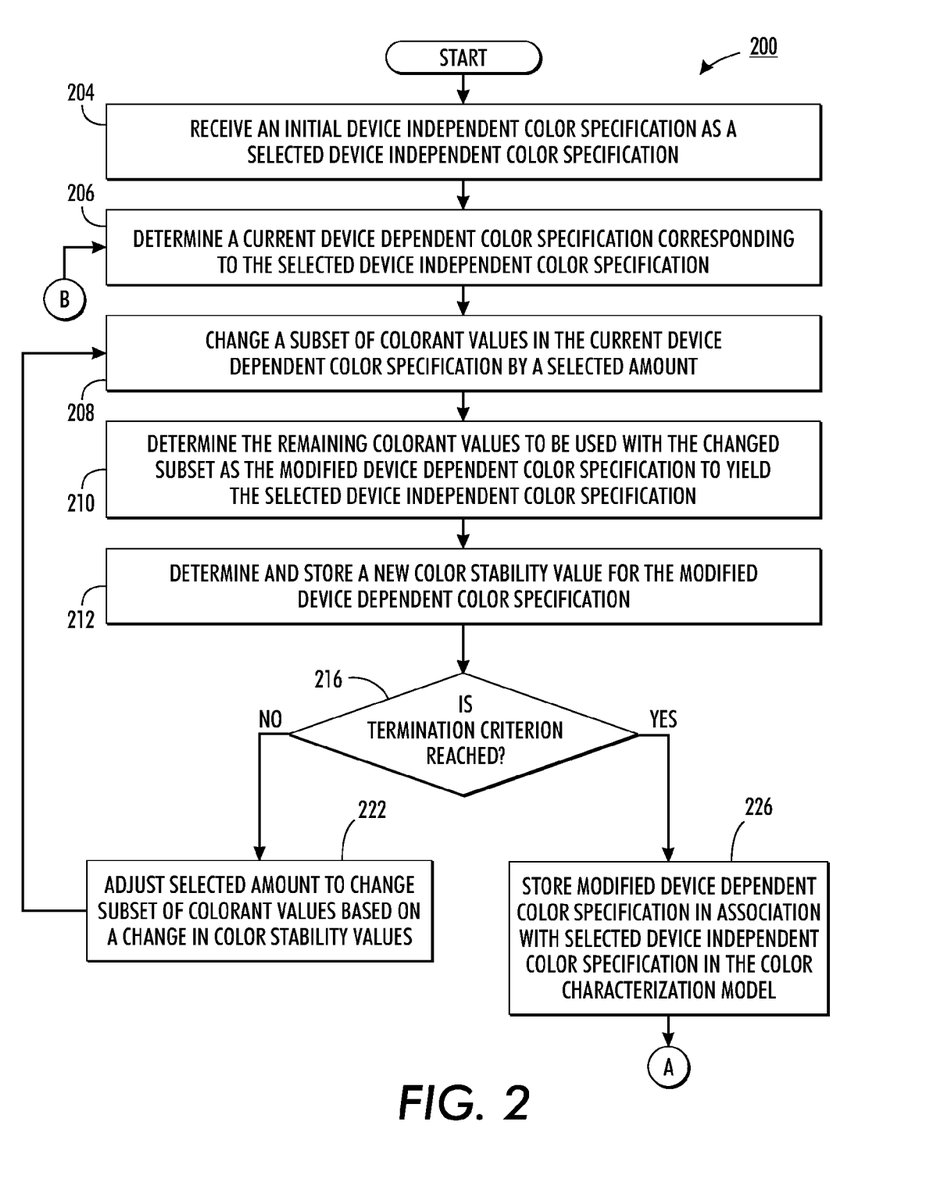
FIG. 2 illustrates a flow diagram of one example embodiment for color characterization model determination process.

Reference is now made to FIG. 2, which illustrates a flow diagram of one example embodiment for a color characterization model determination process.

Color characterization model determination process 200 begins by receiving, at 204, a selected device-independent color specification as a selected device-independent color specification for which a transformation into a device-dependent color specification is to be determined. The selected device-independent color specification is able to be selected as any of a spot color or a node in the color characterization model for the target device. The selected device-independent color specification is also able to be first gamut-mapped to the gamut of the target N-color device for which the transformation is to be determined. The color characterization model determination process 200 continues by determining, at 206, a current device-dependent color specification that corresponds to the selected device-independent color specification. The device-dependent color specification can be determined through the use of, for example, a default color transform for the image output device, such as a default printer profile for the target printer that is specified by an ICC color profile.

The color characterization model determination process 200 continues by changing, at 208, a subset of colorant values in the current device-dependent color specification by a selected amount. The selected amount is able to be initially configured to a default value. As described below, the selected amount is adjusted based upon various criteria. In one embodiment, the subset of colorant values that are changed is one color component value of the device-dependent color specification. Further embodiments are able to change any number of color component values of the device-dependent color specification. The various embodiments are able to change any number of colorant values within the device-dependent color specification that is fewer than the total number of colorants. One example of the present method changes one colorant in a four colorant device-dependent color specification consisting of CMYK values. In one example, the value of the black colorant is changed at this step. In further embodiments determining color characterization models for an N-color image output device, the subset of colorant values within the device-dependent color specification that are changed is equal to N-3 colorant values.

The color characterization model determination process 200 continues by determining, at 210, the values of the remaining color components that will result in generating the selected device-independent color specification when they are used in combination with the above changed subset of color value as a modified device-dependent color specification. The combination of the changed subset of colorant values, as changed in step 208, and the determined remaining color component values at step 210 are used as a modified device specific color specification. In the example of changing, at 208, one color value in the device-dependent color specification of a four color printer, the remaining three colorants are determined, at 210, so that the combination of the new four device-dependent colorant values will still output the same selected device-independent color component as given by the previous combination of the four device-dependent colorant values. In the example of a four color printer, the device-independent color specifications contain three values, thereby providing an underdetermined relationship to the four color values of a device-dependent color specification for a four color printer. This combination of four values, the one changed color component value and the three determined color component values, are then used as the current device-dependent color specification in the following processing.

The color characterization model determination process 200 continues by determining and storing, at 212, a new color stability metric value for the modified device-dependent color specification. In one embodiment, color stability for the various color component values of the modified device-dependent color component specification is determined by a color stability model 116, as shown and described with respect to the embodiment of FIG. 1, that is stored in a look-up table (LUT). Color stability values for device-dependent color specification values that lie between values stored in the LUT are able to be interpolated, as is understood by practitioners of ordinary skill in the art in light of the present discussion. The generation of a color stability model using the actual image output device is described below. Further embodiments of the present method are able to use any suitable color stability model, as is known by practitioners of ordinary skill in the relevant arts.

In step 216, a determination is made whether a termination criterion is met. If the termination criterion is not met, the process proceeds to adjusting, at step 222, the selected amount to change in the subset of colorant values based on a change in color stability values. After changing the selected amount, the processing returns to changing, at 208, the subset of colorant values in the current device dependent color specification by the selected amount.

If a termination criterion is met, at 216, the process continues to step 226, where the current device-dependent color specification is stored in the color characterization model as the device-dependent color specification into which the current device-independent color specification is to be transformed. The termination criterion, for example, could be one or more of the following: the color stability value reaches a threshold value, the color stability value reaches convergence, or a maximum number of iterations being reached.

In one example of a termination criterion, a determination is made whether the new color stability metric value is below (i.e., more stable than) a pre-determined threshold of the color stability metric. If this is true, the solution is determined to be acceptable and the modified device-dependent color specification is stored in the color characterization model, at 226, as the device-dependent color specification into which the selected device-independent color specification is to be transformed. If this is not true, the solution is determined to be not acceptable yet and the processing continues to step 222.

In another example of a termination criterion, a determination is made whether the current color stability metric value is smaller (e.g., by a pre-specified tolerance) than some or all previously stored color stability metric values. If it is not, the solution is determined to have converged and the device-dependent color specification corresponding to the smallest color stability metric value achieved is stored in the color characterization model, at 226, as the device-dependent color specification into which the current device-independent color specification is to be transformed. If it is, the solution is determined to have not yet converged and the processing continues to step 222.

In yet another example of a termination criterion, a determination is made whether the maximum iteration count for evaluating device-dependent color specifications has been reached. Various embodiments are able to set a maximum number of iterations of device-dependent color specifications that are to be evaluated for each device-independent color specification. If the maximum number of iterations has not been reached, the processing returns to step 222. If the maximum number of iterations has been reached, the process continues to step 226.

In yet another example of a termination criterion, the conditions of all three criteria mentioned above are tested in each iteration. If any one of the conditions is met, a termination is determined and the process continues to step 226. If none of the three conditions are met, the process continues to step 222.

In one embodiment, the amount by which the values of the subset of color components are adjusted, in step 222, is based on the color stability metric value for the current device-dependent color specification and the local slopes of the selected subset of the colorants to the color stability value, e.g. $\partial(cs)/\partial(K)$. These local slopes can be readily determined from the color stability model (e.g. CMYK→CS), for example, by passing a small perturbation of the selected subset of the colorants to the color stability model and observing the changes in color stability value.

After storing, at 226, the modified device-dependent color specification, the processing proceeds as described below with regards to FIG. 3.

Figure 3:
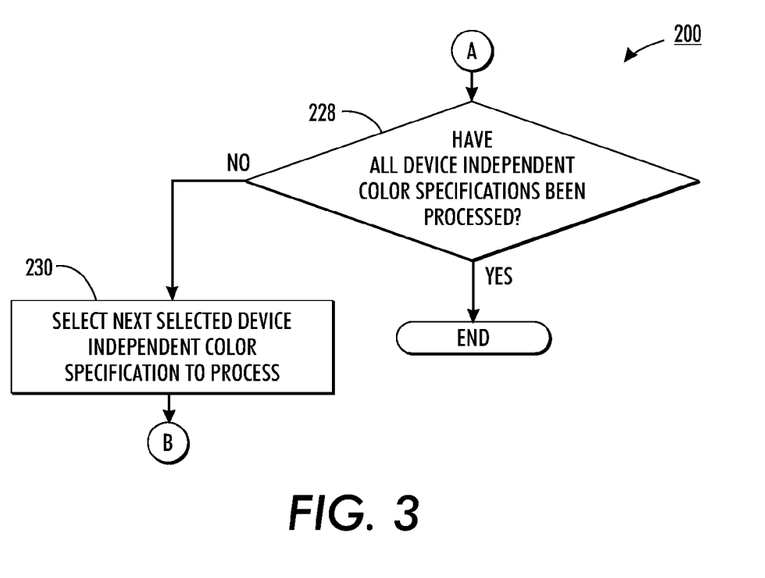
FIG. 3 is a continuation of the flow diagram of FIG. 2 with flow processing continuing with respect to node A.

Reference is now being made to the flow diagram of FIG. 3 which is a continuation of the flow diagram of FIG. 2 with flow processing continuing with respect to node A.

At 228, a determination is made whether all of the device-independent color specification values have been processed. In one embodiment, the number and relationships between values of device-independent color specifications that are to be processed is manually configured based upon a desired quality of the color characterization model. If all of the device-independent color specifications have not been processed, the processing continues by selecting, at 230, the next device-independent color specification that is to be processed as the selected device-independent color specification. The processing then returns to determining, at 206, the device-dependent color specification that corresponds to this new selected device-independent color specification that is to be used as the current device-dependent color specification for subsequent processing. If it is determined that all of the device-independent color specifications have been processed, the processing ends.

In addition to the stability constraints, a smoothness constraint can be applied. This is advantageous when the color characterization model is used to process images with colors that smoothly change from one device independent value to another. In this case, the device-dependent values should also change smoothly to avoid creating unpleasant contours in the printed image. One way of doing this is to process the nodes of the color characterization model using region growing techniques. After processing one node, the next node to be processed is chosen to be adjacent, in LAB space, to the already processed nodes. An additional smoothness metric term, $A_5(cmyk)$ for example, along with the corresponding weight, would be added to the sum in Eq. 1. The term would be large when the difference between the chosen CMYK value and the average CMYK values of the already determined nearby nodes was large. The calculation can be initialized, for example, by starting off with the node corresponding to the color white, since there is generally only one way of making that color.

It should be appreciated that any of the values determined above, or interim values required for any of the above-described determinations, may be stored in any of the embodiments of a storage device, as defined herein.

Example Flow Diagram of Color Stability Model Determination

Figure 4:
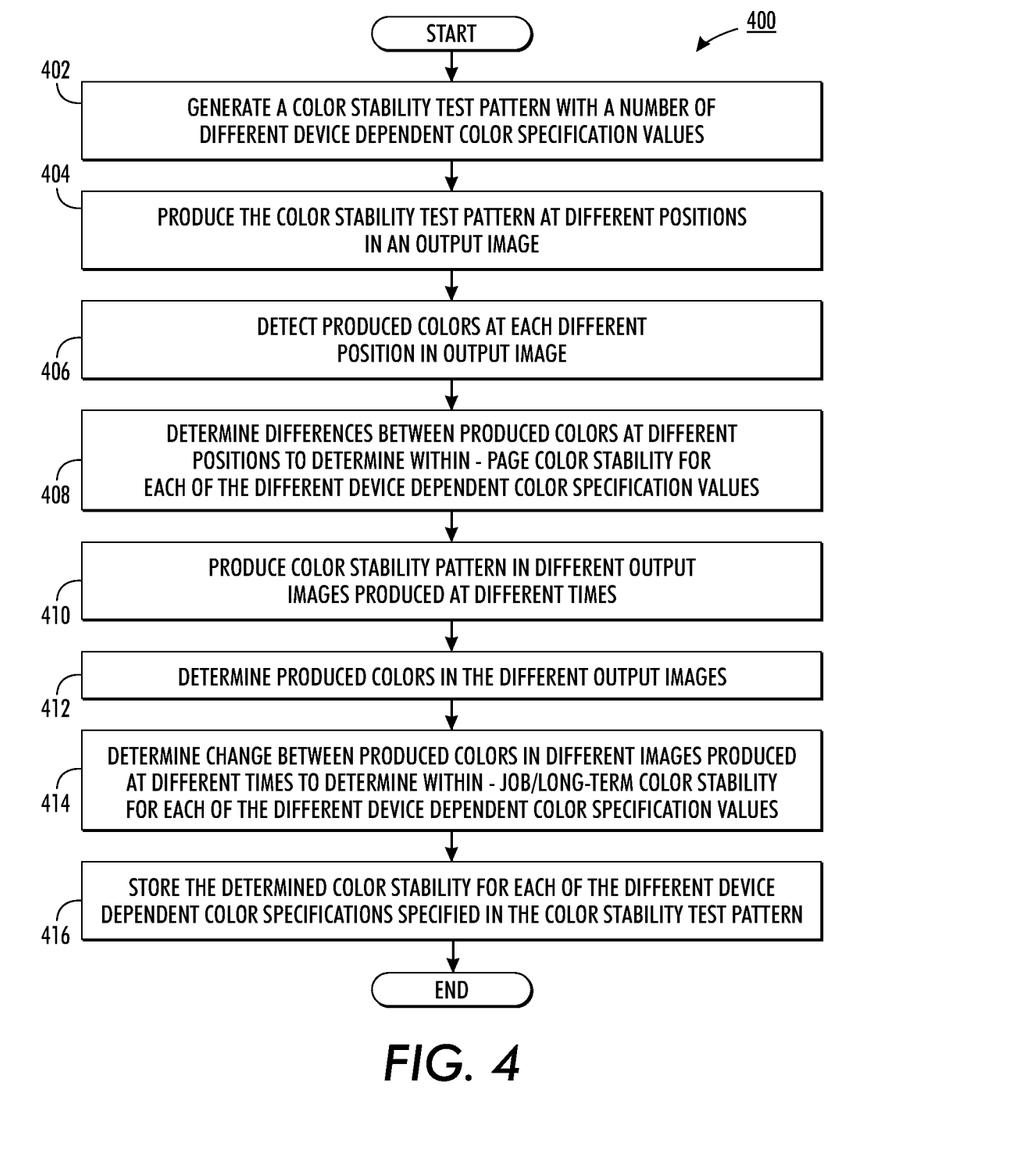
FIG. 4 illustrates a flow diagram of an example embodiment of a color stability model determination process which, in the illustrated embodiment determines color stability metric data for a particular image output device, such as a color printer or electronic display, by processing data detected by sensors monitoring output images produced by that image output device.

Reference is now made to FIG. 4, which illustrates a flow diagram of an example embodiment of a color stability model determination process 400 which, in the illustrated embodiment determines color stability metric data for a particular image output device, such as a color printer or electronic display, by processing data detected by sensors monitoring output images produced by that image output device.

In one embodiment, a color stability function for the gamut of an image output device is determined by making actual color stability measurements for a relatively small number of colors to characterize the color stability of a finite number of points in the color gamut of the image output device. The color stability values for any color combination is then able to be interpolated or extrapolated for color combinations for which measured data is not available. In one example, the color stability within a printed page (i.e., within page stability) and across a number of printed pages (i.e., within job stability) is measured for colors that are defined by a number of device-dependent color specifications that are chosen to produce, for example, four to eight different color intensity levels for each color component of the device-dependent color specification. In an example of a four color printer, characterizing the color stability by measuring actual output using four different color component intensity values for each of the four colors yields $4^4$ different colors, or 256 colors, for which color stability is measured. Color stability for these 256 colors is measured by determining the variation of colors actually produced at various locations on the same page as well as across multiple pages for each of these 256 device-dependent color specifications.

The color stability model determination process 400 begins by generating, at 402, a color stability test pattern to be used to characterize color stability. In one embodiment, the color stability of an image output device is determined by actual measurement of image output color stability for a set of device-dependent color specification values contained in the color stability test pattern. The set of device-dependent color specification values included in the color stability test pattern is defined, for example, to include all combination of device-dependent color specifications that have a specified number of different, equally spaced, values in each color dimension.

The color stability model determination process 400 continues by producing, at 404, the color stability test pattern at different positions across an output image produced by an image output device being characterized. In one example, a printed page is printed that contains the color stability test pattern at different positions on that page. The process continues by detecting, at 406, the color produced at each of those different positions within the output image. This detection is able to be performed, for example, by sensors within a printer producing the image. Further examples include scanning the printed output of a color printer to determine the color actually produced for each of the color stability test patterns that are printed at different positions on the page. The process continues by determining, at 408, differences between the colors of the color stability test pattern and the color actually produced at the different locations of the output image. These differences determine the within page color stability of the image output device.

The color stability model determination process 400 continues by producing, at 410 the color stability test pattern on different output images produced by the image output device. In one example, many printed pages are produced that each contains the color stability test pattern. The process continues by detecting, at 412, the color produced on the different pages. This detection is able to be performed, for example, by the above described techniques. The process continues by determining, at 414, differences between the colors of the color stability test pattern and the color actually produced on the different pages. These differences determine the within job and/or long term color stability of the image output device. The determined within page and within job/long term color stability values are then stored, at 416, in a look up table and serves as the basis of a color stability model 116 of FIG. 1.

Various embodiments of the present method are able to produce a variable number of images between the different output images that are produced and detected at 410 and 412 above. By allowing a large number of images to be produced, a long term job-to-job or long run color stability characterization is able to be made of the image output device. Various applications are able to combine the within page color stability and the within job/long term color stability for the image output device by combining these different color stability values according to a weighted function. For example, when determining color stability for a color characterization model to be used on a single page, a higher weight is able to be given to the within page color stability value than is given to the within job color stability value. Conversely, when developing a color characterization model to be used for long runs of color image production, a higher weight is able to be assigned to the within job or job-to-job color stability value.

It should be understood that the flow diagrams of FIGS. 2, 3 and 4, are intended to be illustrative. Other operations may be added, modified, or consolidated. Variations thereof are intended to fall within the scope of the appended claims.

Example Color Characterization Model Generation System

Figure 5:
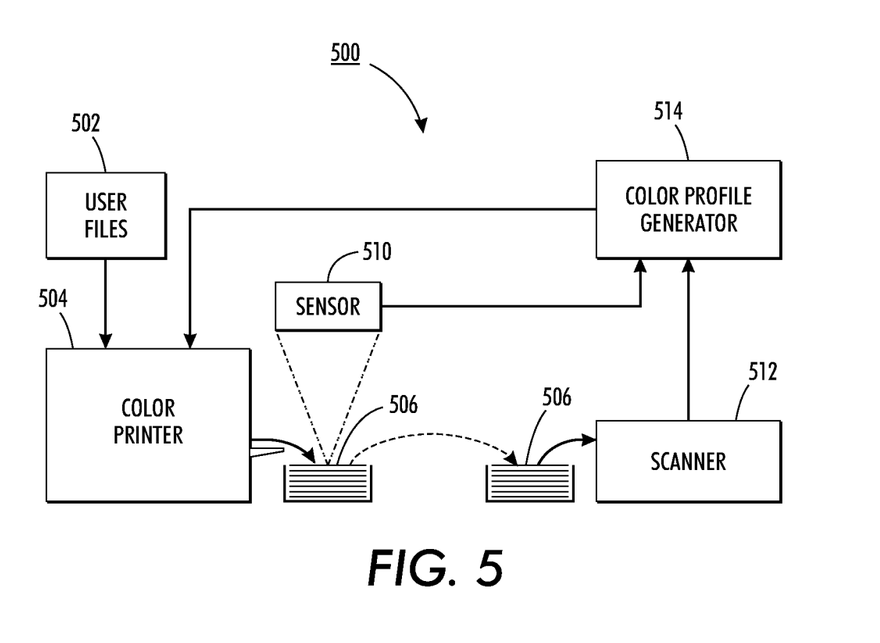
FIG. 5 is a component diagram of an example color characterization model generation system, in accordance with one embodiment of the present method.

Reference is now made to FIG. 5, which is a component diagram of a color characterization model generation system 500, in accordance with one embodiment of the present method, and shown comprising a plurality of modules.

The color characterization model generation system 500 includes a color printer 504 that is able to produce color images in the form of printed output 506. In one embodiment, color printer 504 is a production printer generally used to create user documents from user files 502. User files, in one embodiment, include color images specified in a device-independent color specification, such as in a Lab format. In one embodiment, the color printer 504 has associated equipment to support characterization of the color stability performance of the color printer in order to update a color stability model for that color printer. Based upon this updated color stability model, updated color characterization models are able to be created to provide improved color output performance.

The color characterization model generation system 500 includes image sensing equipment capable of detecting the color produced on an output image to support determining and/or updating a color stability model of an image output system. Image sensor 510 is positioned to capture a digital representation of the color image contained in the printed output 506. An alternative embodiment includes a scanner 512. In one embodiment, the printed output 506 of the color printer 504 is physically transferred to the scanner to enable scanning of the produced color images on the printed output. In the various embodiments, a digital representation of the output image, such as is captured by the sensor 510 or scanner 512, is provided to a profile generator 514. In one embodiment, the profile generator further provides a color stability test pattern to color printer 504 to cause a suitable pattern to be generated by that color printer. The profile generator, of one embodiment, performs the above-described processing to produce a color stability model for the color printer. The color characterization model generator uses that color stability model to produce a color characterization model that defines device-independent color specification to device-dependent color specification transformations that are based upon optimum color stability characteristics determined for the particular color printer.

Figure 6:
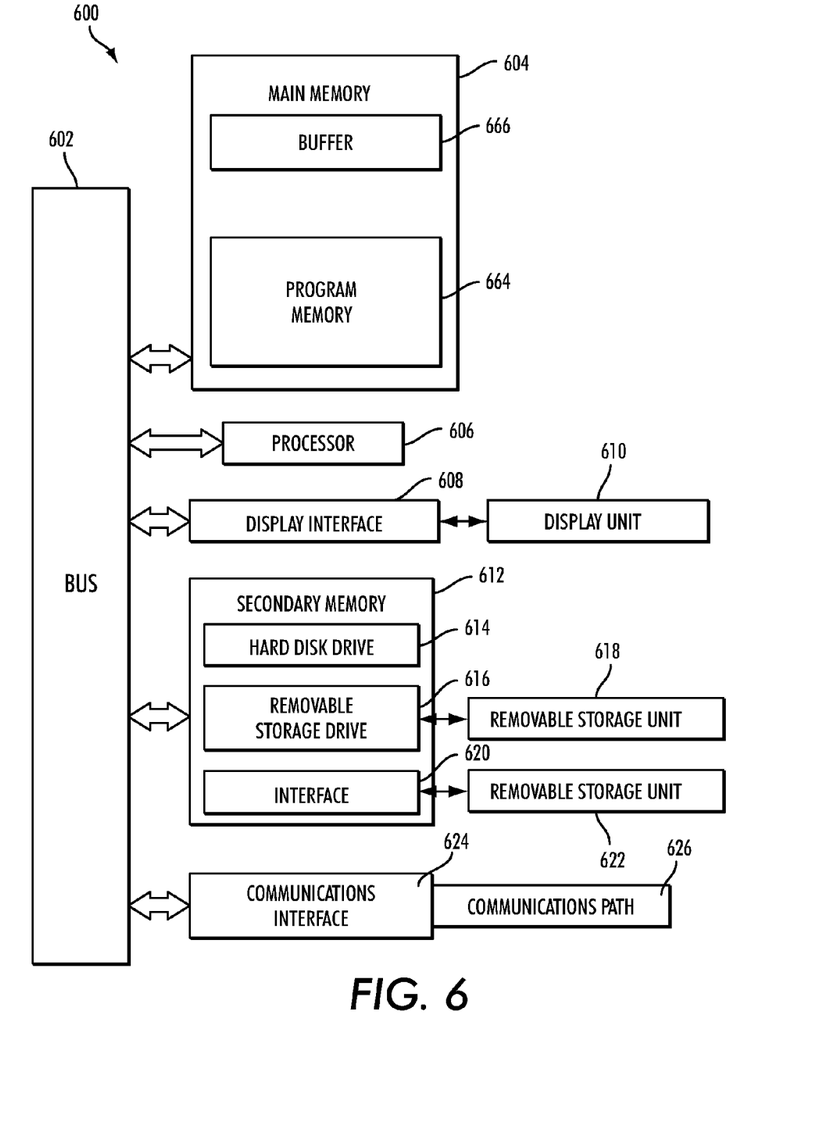
FIG. 6 illustrates a block diagram of one example embodiment of a special purpose computer useful for implementing one or more aspects of the present method, as shown and discussed with respect to the above-described illustrations.

It should be appreciated that the various modules of the schematic of the embodiments of the component diagrams of FIGS. 1 and 5, designate a component of a system which may comprise software and/or hardware designed to perform a function. A plurality of modules may collectively perform one or more functions. A module may have specialized processors capable of reading machine executable program instructions. A module may comprise a single piece of hardware such as an ASIC, electronic circuit, or special purpose computer system such as is shown in FIG. 6. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network.

Schematic of Example Special Purpose Computer

Reference is now made to FIG. 6 which illustrates a block diagram of one example special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the embodiments described herein with respect to the embodiments of FIGS. 1 and 5, and the flow diagram of FIGS. 2, 3 and 4.

Special purpose computer system 600 includes processor 606 for executing machine executable program instructions for carrying out all or some of the present method. The processor is in communication with bus 602. The system includes main memory 604 for storing machine readable instructions. Main memory may comprise random access memory (RAM) to support reprogramming and flexible data storage. Buffer 666 stores data addressable by the processor. Program memory 664 stores machine readable instructions for performing the present method. A display interface 608 forwards data from bus 602 to display 610. Secondary memory 612 includes a hard disk 614 and storage device 616 capable of reading/writing to removable storage unit 618, such as a floppy disk, magnetic tape, optical disk, etc. Secondary memory 612 may further include other mechanisms for allowing programs and/or machine executable instructions to be loaded onto the processor. Such mechanisms may include, for example, a storage unit 622 adapted to exchange data through interface 620 which enables the transfer of software and data. The system includes a communications interface 624 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 626 which carries such signals and may be implemented using wire, cable, fiber optic, phone line, cellular link, RF, memory, or other means known in the arts.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for producing device-dependent color specifications for an N-color device, where N is greater than three, the method comprising:

receiving, with a processor, a selected device-independent color specification;

determining, with the processor, a current device-dependent color specification for a target N-color device, the current device-dependent color specification corresponding to the selected device-independent color specification;

repeating, with the processor, until a termination condition is reached:

creating a set of changed colorant values by changing, by a selected amount, values of a selected subset of colorants within the current device-dependent color specification;

determining, with the processor, a modified device-dependent color specification, the modified device-dependent color specification comprising the changed colorant values for the selected subset of colorants and values determined, based upon a printer model of the target N-color device, for remaining colorants of the modified device-dependent color specification so that the modified device-dependent color specification containing the changed colorant values yields the selected device-independent color specification, the remaining colorants being different from the selected subset of colorants;

determining, with the processor, a new color stability value associated with the modified device-dependent color specification;

adjusting, with the processor, based upon the new color stability value, the amount to change values of the selected subset of colorant values within the device-dependent color specification during a next iteration;

storing, with the processor in a color characterization of the target N color device, the resulting device-dependent color specification as a mapping for the selected device-independent color specification; and outputting the color characterization from the processor.

2. The method of claim 1, wherein the termination condition is based upon at least one of determining that the new color stability value is below a pre-determined threshold, determining that the new color stability value has converged, and performing a pre-defined number of iterations of the repeating.

3. The method of claim 1, wherein the current device-dependent color specification and the modified device-dependent color specification each comprises N color dimensions, and wherein the selected subset of colorant values in the modified device-dependent color specification comprises N-3 colorant values.

4. The method of claim 1, wherein the selected device-independent color specification is any of: a spot color, and a node in the color profile for the device.

5. The method of claim 1, further comprising using the color characterization to perform any of:
printing the resulting device-dependent color specification;
storing the resulting device-dependent color specification to a storage device;
updating a lookup table;
deriving a color profile for the device;
producing a profile for spot color emulation; and
generating a device-dependent recipe for a spot color.

6. The method of claim 1, wherein the selected device-independent color specification is first gamut-mapped to the gamut of the target N-color device.

7. The method of claim 1, wherein determining a new color stability value associated with the modified device-dependent color specification comprises determining a color stability value by interpolation from a look-up table containing a respective color stability value corresponding to each device-dependent color specification within a set of device-dependent color specifications.

8. The method of claim 7, wherein the look-up table is generated by:
determining a color stability value of a target N-color device for each color specification within the set of device-dependent color specifications; and
storing each of the device-dependent color specification and the associated respective color stability value in the look-up table.

9. The method of claim 1, wherein determining the new color stability value comprises calculating a weighted function of at least one parameter each having a respective weighting factor, the at least one parameter comprising at least one of: a within-run color stability, a run-to-run color stability, and a machine-to-machine color stability.

10. The method of claim 9, wherein the respective weighting factors are based on at least one of a user input, and an automatic calculation based on analysis of a candidate print job.

11. The method of claim 1, wherein determining a current device-dependent color specification comprises obtaining the current device-dependent color specification corresponding to the selected device-independent color from a printer model of the target N-color device.

12. The method of claim 11, wherein the printer model is specified by an ICC color profile.

13. A system for producing device-dependent color specifications for an N-color device, where N is greater than three, the system comprising:
a non-transitory memory;
a non-transitory storage medium for storing data; and
a processor in communication with said storage medium and said memory, said processor executing machine readable instructions for performing the method of:
receiving a selected device-independent color specification;
determining a current device-dependent color specification for a target N-color device, the current device-dependent color specification corresponding to the selected device-independent color specification;
repeating until a termination condition is reached:
creating a set of changed colorant values by changing, by a selected amount, values of a selected subset of colorants within the current device-dependent color specification;
determining a modified device-dependent color specification, the modified device-dependent color specification comprising the changed colorant values for the selected subset of colorants and values determined, based upon a printer model of the target N-color device, for remaining colorants of the modified device-dependent color specification so that the modified device-dependent color specification containing the changed colorant values yields the selected device-independent color specification, the remaining colorants being different from the selected subset of colorants;
determining a new color stability value associated with the modified device-dependent color specification;
adjusting, based upon the new color stability value, the amount to change values of the selected subset of colorant values within the device-dependent color specification during a next iteration;
storing, in a color characterization of the target N color device, the resulting device-dependent color specification as a mapping for the selected device-independent color specification; and
outputting the color characterization.

14. The system of claim 13, wherein the termination condition is based upon at least one of determining that the new color stability value is below a pre-determined threshold, determining that the new color stability value has converged, and performing a pre-defined number of iterations of the repeating.

15. The system of claim 13, wherein the current device-dependent color specification and the modified device-dependent color specification each comprises N color dimensions, and wherein the selected subset of colorant values in the modified device-dependent color specification comprises N-3 colorant values.

16. The system of claim 13, wherein determining a new color stability value associated with the modified device-dependent color specification comprises determining a color stability value by interpolation from a look-up table containing a respective color stability value corresponding to each device-dependent color specification within a set of device-dependent color specifications.

17. The system of claim 16, wherein the look-up table is generated by:
- determining a color stability value of a target N-color device for each color specification within the set of device-dependent color specifications; and
- storing each of the device-dependent color specification and the associated respective color stability value in the look-up table.

18. The system of claim 13, wherein determining the new color stability value comprises calculating a weighted function of at least one parameter, the at least one parameter comprising at least one of: a within-run color stability, a run-to-run color stability, and a machine-to-machine color stability.

19. The system of claim 18, wherein the respective weighting factors are based on at least one of a user input, and an automatic calculation based on analysis of a candidate print job.

20. A method for producing device-dependent color specifications for an N-color device, where N is greater than three, the method comprising:
- producing, with the target N-color device, a plurality of color stability test patterns, each color stability test pattern specifying a plurality of device-dependent color specifications;
- determining, with a sensor, produced color values for each of the plurality of color stability test patterns produced by the target N-color device;
- determining, based on the produced color values for each of the plurality of color stability test patterns as determined by the determining, at least one color stability characteristic of the target N-color device;
- receiving, with a processor, a selected device-independent color specification;
- determining, with the processor, a current device-dependent color specification for a target N-color device, the current device-dependent color specification corresponding to the selected device-independent color specification;
- repeating, with the processor, until a termination condition is reached:
  - creating a set of changed colorant values by changing, by a selected amount, values of a selected subset of colorants within the current device-dependent color specification;
  - determining, with the processor, a modified device-dependent color specification, the modified device-dependent color specification comprising the changed colorant values for the selected subset of colorants and values determined, based upon a printer model of the target N-color device, for remaining colorants of the modified device-dependent color specification so that the modified device-dependent color specification containing the changed colorant values yields the selected device-independent color specification, the remaining colorants being different from the selected subset of colorants;
  - determining, with the processor, a new color stability value associated with the modified device-dependent color specification;
  - adjusting, with the processor, based upon the new color stability value, the amount to change values of the selected subset of colorant values within the device-dependent color specification during a next iteration;
- storing, with the processor in a color characterization of the target N color device, the resulting device-dependent color specification as a mapping for the selected device-independent color specification; and
- outputting the color characterization from the processor.

* * * * *